United States Patent [19]

Albrecht et al.

[11] 3,742,288

[45] June 26, 1973

[54] RASTER CONTROL DEVICE FOR CONTROLLING THE POSITIONING OF THE RASTER AT THE BEGINNING OF EACH NEW LINE

[75] Inventors: Francis E. Albrecht, Bridgeport; William D. Baxter, Seymour, both of Conn.; John De Michiel, Mamaroneck, N.Y.; Robert J. Duggan, Monroe, Conn.; Carl Greenblum, Stamford, Conn.; Stephen A. Grosky, Monroe, Conn.; Arthur Langer, Stamford, Conn.

[73] Assignee: Bunker Ramo Corporation, Oak Brook, Ill.

[22] Filed: Sept. 8, 1971

[21] Appl. No.: 178,691

[52] U.S. Cl. .......................... 315/18, 340/324 AD

[51] Int. Cl. .......................................... H01j 29/70

[58] Field of Search ................ 340/324 A, 324 AD; 315/18, 19, 22

[56] References Cited

UNITED STATES PATENTS

| | | | |
|---|---|---|---|
| 3,643,252 | 2/1972 | Roberts | 340/324 AD |
| 3,573,732 | 4/1971 | Greenblum | 340/324 AD |
| 3,668,687 | 6/1972 | Hale | 315/18 |
| 3,432,845 | 3/1969 | Douglas et al. | 315/22 |

*Primary Examiner*—Carl D. Quarforth
*Assistant Examiner*—J. M. Potenza
*Attorney*—Frederick M. Arbuckle

[57] ABSTRACT

A circuit for controlling the raster of a cyclically scanned display device such as a cathode ray tube (CRT). The circuit may control both the horizontal and vertical positioning of the raster at the beginning of each new line of the display. The line positioning control responds to predetermined sync pulse patterns generated in response to detected raster position, data type, or other conditions. The raster may advance a predetermined number of full or partial line positions in response to a received sync pulse pattern, for example a single sync pulse, and may advance an additional like number of full or partial line positions in response to a variation in the received sync pattern, such as for example the receipt of additional sync pulses. The horizontal position at which each line of the display commences is controlled by a circuit which is operative in response to variations in the received sync pulse pattern for altering the line starting position.

17 Claims, 5 Drawing Figures

RASTER CONTROL DEVICE FOR CONTROLLING THE POSITIONING OF THE RASTER AT THE BEGINNING OF EACH NEW LINE

This invention relates to a device for controlling the raster of a cyclically scanned display device such as a cathode ray tube (CRT) and more particularly to a device for controlling the positioning of the raster at the beginning of each new line thereof.

BACKGROUND

Information may be traced on the face of a cyclically scanned display device such as a cathode ray tube (CRT) in one of two manners. The more common method is by use of a TV raster with a plurality of horizontal sweeps of the screen being performed for each character to be displayed. While a TV raster permits great flexibility in the type of display which may be presented, it also requires that a bit be transmitted for each bit of the display (i.e., video code must be transmitted). This limiation mitigates against the use of TV raster displays for applications where information is to be transmitted. This problem has been partially overcome by providing extra memory at the receiver, reading out the information to be displayed a line at a time into the extra memory, and generating the video code for each character a number of times equal to the number of horizontal sweeps of the screen required for each character. While the last-mentioned mode of operation overcomes the transmission bandwidth problem, it also significantly increases the storage and character generating requirements at the terminal and the general complexity of the terminal.

The second method utilizes a scan such as that shown in U.S. Pat. No. 3,500,327 issued Mar. 10, 1970 to R.D. Belcher, et al., entitled "Data Handling Apparatus" and assigned to the assignee of the instant application. With this type of raster, each line of the display is formed during a single horizontal sweep across the screen. During each horizontal sweep there are a plurality of vertical strokes with five vertical strokes having seven index points each being utilized for the display of each character. Transmission code is transmitted and stored. This code is then passed through a video character generator once for each display of the character and the video coded bits applied to control the intensification of the beam as it traces the five strokes for the character. This type of display thus makes efficient use of transmission bandwidth and minimizes required storage, character generating, and other hardware at the terminal. However, this type of display is somewhat lacking in flexibility.

For example, this type of display is normally limited to displaying characters the bits of which are confined to the stroke area of a given line. It is thus not possible to display subscripts or superscripts or to display part of the information for a line one-half line below the remainder of the information as is, for example, normally done when displaying stock market ticker. Another problem arises from the fact that there is synchronization between the reading out of memory and the tracing of the character read out on the display screen. Since the memory and the display device may be situated remote from each other, transmission line time is involved in sending information between these two devices. Therefore, if there are portions of the screen which are traced by the raster but on which no data is to be displayed, the synchronism between the raster and the memory requires that blank information be stored in memory for these areas and that this blank information be transmitted during the time interval that the raster passes these areas. This results in inefficient utilization of both the memory and the line. Therefore, both line and memory utilization could be significantly improved if the raster could be restricted to areas of memory on which display is desired.

In cathode ray tube display systems which are presently in existence, it is assumed that the display will cover substantially the entire screen and the raster therefore traces over this relatively large area. However, it is apparent that in some applications only a limited amount of data will be displayed on the screen at a given time. Knowledge of this fact may lead to significant storage space and line bandwidth savings. This would be accomplished by noting at the CPU or elsewhere the lines being displayed and the starting point for each line. A multi-line skip editing instruction could then be utilized to reach the appropriate line with suitable control being provided to indent the line to the indicated start position. The frame could then be terminated normally or a multiple line skip to the terminal line of the frame could be executed after the line or lines having data have been refreshed.

It is, therefore, a primary object of this invention to provide an improved method and apparatus for controlling the raster of a cyclically scanned display device such as a CRT.

A more specific object of this invention is to permit the spacing between lines of such a raster to be selectively varied.

A still more specific object of this invention is to provide a raster control circuit of the type indicated above where less than a full line space may be provided between two successive lines.

A further object of this invention is to provide a raster control circuit of the type indicated above wherein the horizontal position at which each line is initiated may be varied and controlled.

SUMMARY OF INVENTION

In accordance with these objects, this invention provides a circuit for controlling the movement of a multiline raster on a cyclically scanned display device such as a cathode ray tube (CRT). A means is provided for incrementing the raster from line to line in steps of predetermined size. A means is also provided for indicating the number of steps which the raster is to be incremented between each two lines of the raster. There are means normally operative to generate a single pulse between raster lines and means responsive to an indication from the indicating means that more than one step is required for generating an additional sync pulse for each additional step required. Each of the sync pulses follows the preceding one by a predetermined time interval. A control means responsive to each of the sync pulses causes the incrementing means to increment the raster by one step in response to each received sync pulse.

The circuit also includes a means for controlling the horizontal position at which each line of the raster begins. A suitable means detects selected display data types and raster position conditions and, a means operative in response to the detected conditions alters the position at which the position controlling means initiates a line of the display.

The foregoing and other objects, features and advantages of the invention will be apparent from the following more particular description of a preferred embodiment of the invention as illustrated in the accompanying drawings.

DETAILED DESCRIPTION

Figure 1:
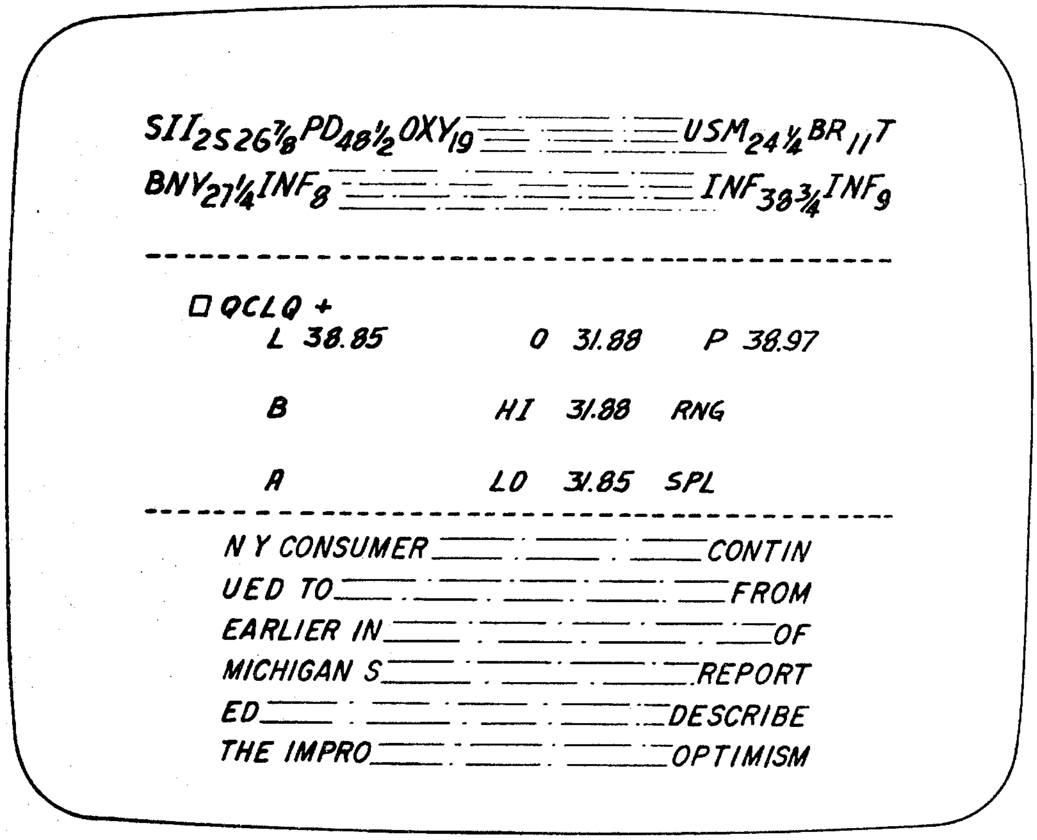
FIG. 1 is an illustration of an exemplary display formed on the face of a CRT utilizing the teachings of this invention.

Referring now to FIG. 1, it may be seen that the display is divided into three segments. The first segment contains New York Stock Exchange (NYSE) ticker and American Stock Exchange (ASE) ticker. The second segment contains various items of information on a selected stock and the third segment contains newswire information. The particular information contained within each of the segments is not critical.

From FIG. 1 it is seen that segments 2 and 3 are narrower than segment 1. The reason for this is that, since ticker is a moving display, maximum line width is required to permit the longest possible viewing time for the information. The information in the other segments being stationary, the same requirement does not exist. Also, from FIG. 1, it is seen that each transaction recorded on the ticker consists of two separate portions. There is an alphabetic portion which contains the stock identification code and a mostly numeric portion which gives the volume and price. Existing ticker displays space these two items of information roughly half a line apart so as to permit easy differentiation between them. Spacing these tiems a full line apart causes excessive eye movement on the part of the viewer, and has been found to be not aesthetically pleasing. However, as indicated previously, existing CRT displays of the non-TV raster type are not normally capable of half line spacing and the novel mechanism to be described shortly is required for this purpose.

Figure 2:
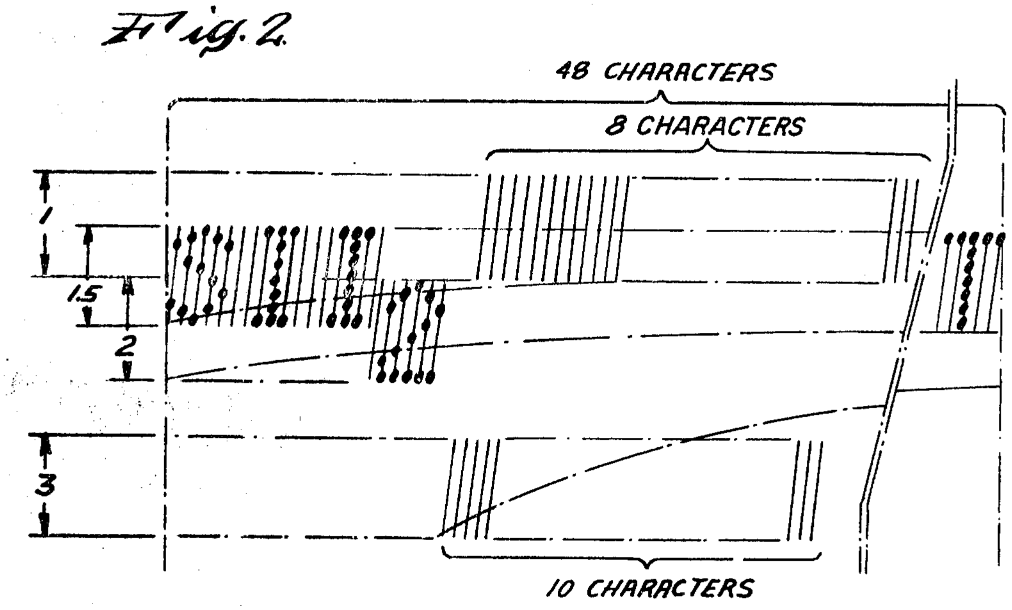
FIG. 2 is an illustration of a portion of the display shown in FIG. 1 illustrating in greater detail the raster pattern utilized.

FIG. 2 illustrates the unique raster timing utilized for the ticker display of FIG. 1. For the illustrative embodiment of the invention, each normal line is 40 characters long. Thus, if the display is divided into three line segments for storage, and six character times are assumed for each of the three line retraces, each segment contains 120 characters plus 18 character retrace clocks, for a total of 138 character clocks. In order that the system synchronization can be maintained between ticker segments and other segments, a ticker segment should likewise consist of only 138 character clocks. However, each of the two lines of ticker are 48 characters long. This means that the third line can be only 24 characters long in order that the total may not exceed 120 characters. However, for reasons which are explained in copending application Ser. No. 178,690 filed on Sept. 8, 1971 on behalf of Frank Albrecht, et al, entitled "Method and Apparatus for Generating a Traveling Display" and assigned to the assignee of the instant application, a ticker segment is actually broken into four lines, a line 1 which is only eight characters long a line 1.5 on which the stock ID's are displayed, which line is 48 characters long, a line 2 on which the price and volume for each transaction are displayed which line is also 48 characters long, and a line 3 which is blank and is 10 characters long. The last line is 10 rather than 16 characters long because of the six extra line retrace character clocks required with a four rather than three line segment. The manner in which a raster of this type is obtained for ticker and a normal three line raster is obtained for the remainder of the segments will now be described.

Figure 3:
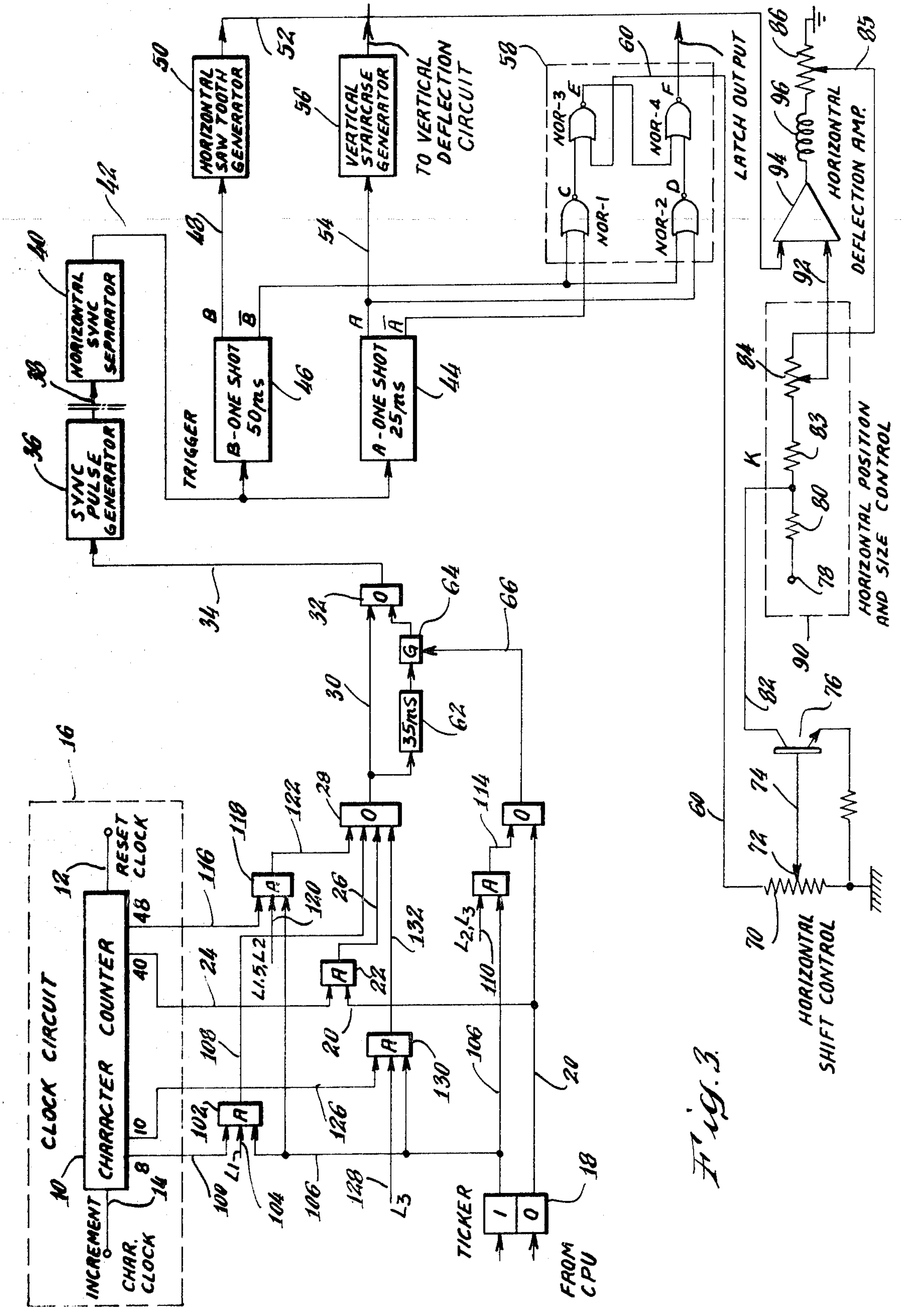
FIG. 3 is a semi-block schematic diagram of a preferred embodiment of the invention.

Referring now to FIG. 3, it is seen that the circuit includes a character counter 10 which is reset by a signal on line 12 at the beginning of each line of the display and is incremented by each character clock generated thereafter. The character clocks are applied to the counter through line 14. Character counter 10 is part of a clock circuit 16 which includes means for generating various clocks such as the character clock, and counters for indicating the position of the raster at any given moment. In order to simplify the drawing, except for the outputs from the character counter, no attempt will be made to connect the various clock signals to circuit 16.

Assume initially that the display is displaying data such as that shown in segment three of FIG. 1 where each line is 40 characters long and the lines are spaced one full line from each other. Under these conditions, ticker flip flop 18 is reset under external control to its zero state causing a signal to appear on its zero side output line 20. This signal is applied as one input to AND gate 22. When character counter 10 has been stepped to a count of 40 for a given line, a signal appears on output line 24 from the counter fully conditioning AND gate 22 to generate an output on line 26 which is applied through OR gate 28, line 30, OR gate 32, and line 34 to trigger sync pulse generator 36. The pulse generated by generator 36 is approximately 4 microseconds long and is applied through line 38 to horizontal sync separator circuit 40.

Line 38 is in fact a transmission line between a central station and a remote station at which a display device is located. Various sync pulses of various widths are applied to line 38 to control stroke generation, horizontal retrace, and frame retrace for example. Horizontal sync separator 40 recognizes a pulse of, for example, 4 microseconds as being a horizontal sync pulse, and passes only pulses of this width.

Figure 4:
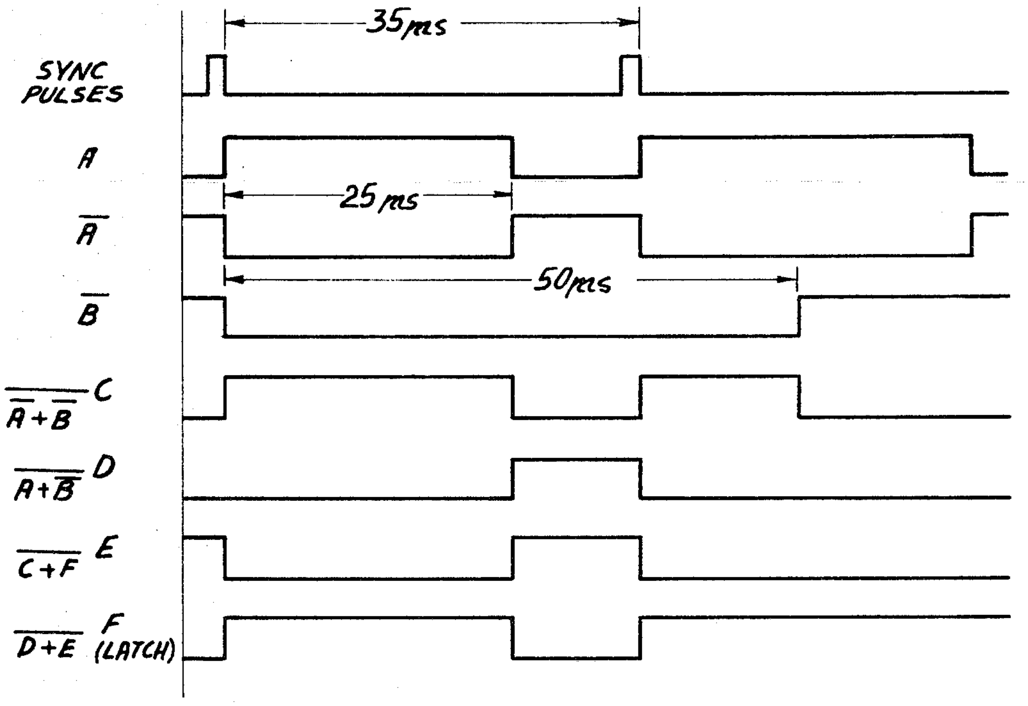
FIGS. 4 and 5 are timing diagrams illustrating the output at various points in the circuit of FIG. 3 under different operating conditions.
Figure 5:
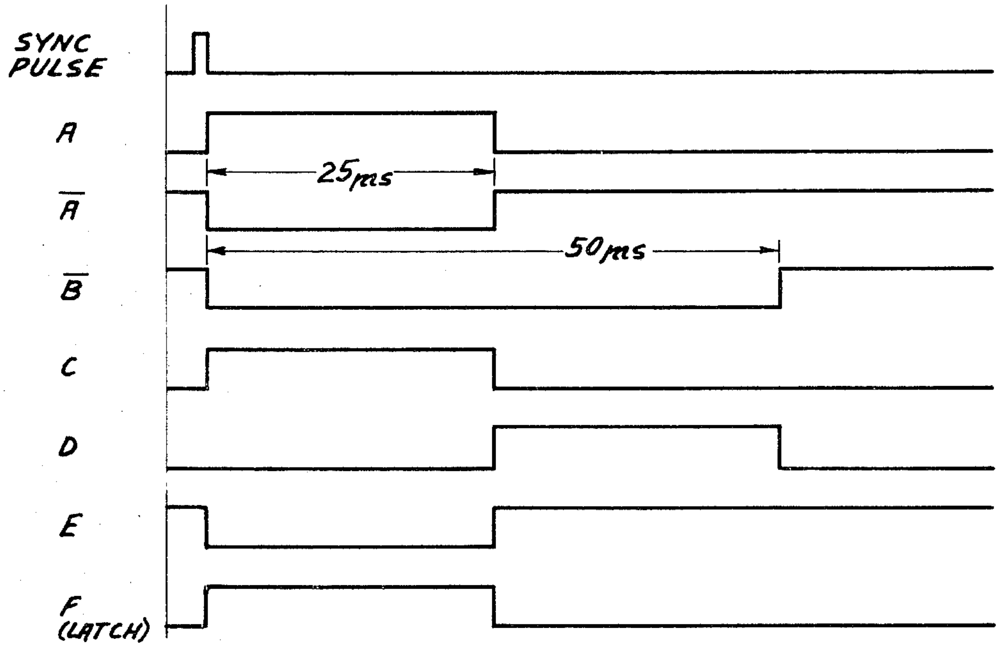

The pulse passed by separator 40 to line 42 is operative to set both a 25 microsecond A one-shot 44 and a 50 microsecond B one-shot 46. The setting of B one-shot 46 causes a signal to appear on line 48 which is applied to permit the discharge of horizontal sawtooth generator 50. This causes the voltage level on line 52 to be sharply reduced. A single-shot 44 being set causes a signal to appear on line 54 which is applied to vertical staircase generator 56 to increase the charge therein by a predetermined amount. The output from generator 56 is applied to control the current to the vertical deflection coil of the CRT (not shown) with a quantum increase in the charge stored in the generator causing a step movement of the beam downward by one-half line on the display. The single sync pulse is thus effective to move the raster down by one-half line. From FIGS. 4 and 5 it is also seen that with both the A and B single-shots set, NOR gates 1 and 4 of circuit 58 are generating positive outputs while NOR gates 2 and 3 of this circuit are generating negative or zero outputs. The output from NOR gate four on line 60 is referred to as the latch output and the function of the signal on this line will be described shortly.

Referring again to line 30, it is seen that, in addition to being applied as an input to OR gate 32, it is also connected as an input to 35 microsecond delay circuit 35 Delay 62 may be a magnetostrictive delay line or similar device or may be in the form of an electronic device which performs the equivalent function. For an alternative embodiment of the invention, the delayed output is obtained by gating through a clock which occurs roughly 35 microseconds after the original sync pulse is generated. Regardless of how the delay is obtained, its output is applied as the information input to gate 64. The conditioning input to this gate is obtained through line 66 from OR gate 68. One of the inputs to OR gate 68 is the beforementioned zero-side output line 20 from ticker flip flop 18. A signal thus appears on line 66 under the conditions indicated above conditioning gate 64 to pass the delayed signal through gate 64, OR gate 32, and line 34 to retrigger sync pulse generator 36. A second sync pulse, delayed 35 microseconds from the first sync pulse, thus appears on line 38.

The second sync pulse appearing on line 42 finds B one-shot 46 still set and is thus ineffective to change the state of this circuit. However, since the duration of A one-shot 44 is only 25 microseconds, this circuit resets prior to the receipt of the second sync pulse and is thus set to its one state for a second time during the horizontal retrace time interval. The second setting of one-shot 44 results in a second pulse on line 54 which is effective to add another quantum of charge to vertical staircase generator 56 thus moving the raster down another half line. The normal full line advance of the raster is in this manner provided.

Again, referring to FIG. 4, it is seen that the latch output on line 60 from circuit 58 goes to zero when the A one-shot times out and comes back up when the A one-shot is again set. Once latched, the latch remains in this condition with an output on line 60 for the entire succeeding line. With ticker flip-flop 18 reset, circuit 58 generates a latch output on line 60 except during the brief intervals between lines when the A one-shot is reset and the B one-shot is set.

Line 60 is connected through potentiometer 70 to ground. A signal on line 60 is thus effective to alter the potential at pick-off point 72 of the potentiometer. This point is connected through line 74 to the base of transistor 76. The transistor is biased so as to be cut-off when there is no signal on line 60. When a signal appears on line 60, the transistor becomes conductive providing a shunt path to ground from 30 volt source 78 through resistor 80 and line 82. The other path to ground for the potential from source 78 is through resistor 80, resistor 83, potentiometer 84, and potentiometer 86. Resistors 80, 83 and 84 form part of a horizontal position and size control circuit 90. The tap-off point of potentiometer 84 is connected through line 92 as one input to horizontal deflection amplifier 94, the other input to this amplifier being the before mentioned output line 52 from horizontal sawtooth generator 50. The output from amplifier 94 is fed through horizontal deflection coil 96 of the CRT (not shown) and potentiometer 86 to ground.

In operation, when transistor 76 is non-conductive, and generator 50 is fully discharged, the negative current flow through coil 96 is sufficient to cause the CRT beam to move all the way to the left of the CRT screen. The beam is thus positioned at the beginning of, for example, a ticker line. When, however, a signal appears on line 60 switching transistor 76 to a conductive state, the shunting of current through transistor 76 to ground effectively reduces the potential at the junction point between resistors 80 and 83. This causes a lower negative potential to appear at the tap-off point of potentiometer 86, thus reducing the current flow through horizontal deflection coil 96. With less current flowing through coil 96, the beam does not move as far to the left as it otherwise would. Potentiometer 70 may be adjusted to vary the current shunted through transistor 76. The more current shunted through the transistor, the further to the right each line of the display will begin. For the embodiment of the invention described above, potentiometer 70 is set so that each line begins four character positions in from the left edge of the screen.

Assume now that the ticker portion of the display shown in FIG. 1 is to be presented on the screen. Under this operating condition, flip flop 18 is set to its one state by an external processing unit. From FIG. 2 it is seen that the first line of the ticker display is only eight characters long. Thus, when character counter 10 reaches a count of eight, the resulting output on line 100 is applied as one input to AND gate 102. The other inputs to this AND gate are a line 1 clock 104 and one-side output line 106 from ticker flip flop 18. AND gate 102 is thus fully conditioned at this time to generate an output signal on line 108 which is applied through the before-mentioned OR gates 28 and 32 to trigger sync pulse generator 36. The resulting sync pulse on line 38 is again effective to set both the A one-shot and the B one-shot causing a horizontal retrace of the beam and a half-line vertical step. The signal on line 30 is also applied to delay 62. However, a conditioning input to gate 64 from OR gate 68 occurs only under one of two conditions. The first is when ticker flip flop 18 is in its zero state and a signal appears on line 20. The other condition is when ticker flip flop 18 is in its one state with a signal on line 106 and either line 2 or line 3 is being displayed causing a signal to appear on clock line 110. Under the later condition, AND gate 112 is fully conditioned to apply an input through line 114 to OR gate 68. Since neither of the above conditions exist at the point in the circuit operating cycle indicated above, gate 64 is not conditioned and only a single sync pulse is applied to line 38 during the line retrace time interval.

With a single synce pulse, only a half line step is effected. Further, referring to FIG. 5, it is seen that circuit 58 resets when A single-shot 44 times out and the zero output from this circuit remains on line 60 if a second sync pulse is not received. Thus, for the single sync pulse condition, transistor 76 is non-conductive permitting full current to flow through coil 96 and the beam to be deflected to the extreme left edge of the screen. The desired full line for ticker is in this manner obtained.

From FIG. 2 it is seen that the next line of the display, designated line 1.5, is 48 characters long. Thus, when counter 10 reaches a count of 48, a signal appears on line 116. This signal is applied as one input to AND gate 118, the other inputs to this AND gate being clock line 120 and one-side output line 106 from ticker flip flop 18. A signal appears on clock line 120 when either line 1.5 or line 2 is being traced. A signal on output line 122 from AND gate 118 is applied through OR gates 28 and 32 to trigger sync pulse generator 36. The resulting sync pulse on lines 38 and 42 is effective to cause a horizontal retrace and half line advance in the manner previously indicated. Again, neither of the conditions required for a second sync pulse to be generated are present. The required half line advance and horizontal retrace to the left edge of the screen are thus achieved.

Again from FIG. 2, it is seen that line 2 of the display is also 48 characters long. AND gate 118 (FIG. 3) is thus also fully conditioned at the end of this line to cause a sync pulse to appear on line 42. However, L2 is one of the conditions causing a pulse to appear on line 110. AND gate 112 is thus fully conditioned at this time to generate an output on line 114 which is applied through OR gate 68 to condition gate 64 to pass the delayed pulse on line 30, causing a second sync pulse to be generated. The second sync pulse is effective, as indicated previously, to cause the third line to be a full line advanced from the second line and to cause this line to start four character positions in from the left edge of the screen.

Finally, from FIG. 2, it is seen that the third line of the ticker display is only 10 characters long. Thus, referring again to FIG. 3, output line 126 from character counter 10, in conjunction with an L3 clock on line 128 and one-side ticker output line 106 fully condition AND gate 130 to generate an output on line 132 which is applied through OR gates 28 and 32 to trigger sync pulse generator 36. Since L3 is another one of the conditions causing a pulse to appear on line 110, AND gate 112 is again conditioned permitting a second sync pulse to be generated at the end of line 3 of the ticker display. The raster thus begins the first line of the next segment in the proper line position and in the indented position required to form most of the display segments. Should the next segment be a ticker segment, beginning the segment at the indented position causes no problem since, as previously indicated, no characters appear on this line.

It is apparent that while a maximum of two sync pulses were generated with the circuit shown in FIG. 3, a greater number of sync pulses could be generated if more steps were required between lines. This could, for example, be accomplished by gating the output from delay 62 back to its input under the desired conditions. Normally, 100 microseconds are provided during horizontal retrace time. Thus, with the timing indicated, three pulses could easily be provided (the duration of B one shot 46 would have to be increased). If more than three sync pulses are required, the timing for the single shots and sync pulses would have to be adjusted in order to permit the required number of pulses to be generated within the allotted time.

It is also apparent that full line steps rather than half line steps could be effected with the multiple jumps so as to rapidly move the raster to a desired line or that the steps could be of smaller increment so that, for example, three steps would be required for a full line in applications where such a requirement might exist.

From the description above, it is apparent that line positioning control is accomplished with this invention in response to variations in received sync pulse patterns. For the preferred embodiment of the invention, a received sync pulse pattern having a single 4 microsecond sync pulse is utilized for half line advances with the raster returning to the left edge of the display screen. A sync pattern of two 4 microsecond pulses spaced 35 microseconds apart is utilized for full line spacing, with each line starting four characters indented from the left edge of the display. Where additional spacing is required, other patterns having additional sync pulses have been indicated as being possible. All that is required is that the spacing between these pulses be greater than the duration of single shot 44. While it is preferable that the spacing between these pulses be uniform, it is not essential. Again, while the pattern for the preferred embodiment of the invention utilizes sync pulses of a given duration which are spaced from each other, with suitable modifications in the response circuitry, similar results could be obtained by varying the duration of the sync pulses themselves. Thus, the first sync pattern could be the same as that for the preferred embodiment of the invention, a single 4 microsecond sync pulse. Delay 62 could also be 4 microseconds so that, when gate 64 is conditioned, the resulting sync pulse would be eight rather than 4 microseconds long. A circuit such as separator 40 could detect this difference and trigger suitable circuitry for effecting the desired full or partial line advances and/or horizontal position control of the line.

Further, while, for the preferred embodiment of the invention, the conditions which cause the multiple advances and which cause the line starting position to change were the same, different conditions might give rise to each of these raster variations. Thus in suitable applications, the circuitry for controlling the line starting position could be responsive to its own circuit condition detecting circuitry. Similarly, conditions other than the display data type and raster position conditions indicated above might be utilized in making the determinations. While specific elements have been indicated for performing the various functions, it is apparent that hardware or software capable of performing the required function could in most instances be substituted for the specific element recited. Thus while the invention has been particularly shown and described with reference to a preferred embodiment thereof, it will be apparent to those skilled in the art that the foregoing and other changes in form and details may be made therein without departing from the spirit and scope of the invention.

What is claimed is:

1. A circuit for controlling the movement of a multiline raster on a cyclically scanned display device comprising:

means for incrementing said raster from line to line in steps of predetermined size;

means for indicating the number of steps by which said raster is to be incremented between each two lines of said raster;

means normally operative for generating a first predetermined sync pulse pattern between raster lines;

means responsive to an indication from said indicating means that more than one step is required for generating a different sync pulse pattern for each number of steps required; and control means responsive to each of said sync pulse patterns for causing said incrementing means to increment said raster by the required number of steps.

2. A circuit of the type described in claim 1 wherein said indicating means includes means for detecting various display data type, raster position, and/or other conditions;

and means responsive to the detected conditions for generating a signal representing the number of incrementing steps.

3. A circuit of the type described in claim 1 wherein said means for generating a first predetermined sync pulse pattern includes means for generating a single sync pulse;

wherein said means for generating different sync pulse patterns includes means for generating an additional sync pulse for each additional step required; and wherein said control means includes means responsive to each of said sync pulses for causing said incrementing means to increment said raster by one step.

4. A circuit of the type described in claim 3 wherein each of said sync pulses follows a preceding pulse by a predetermined time interval.

5. A circuit of the type described in claim 3 wherein each of said sync pulses is of predetermined duration; and wherein said control means includes means for detecting sync pulses of said predetermined duration.

6. A circuit of the type described in claim 3 wherein said control means includes a single-shot the duration of which is less than the time between sync pulses, said incrementing means being operative to increment the raster by one step in response to each setting of said single-shot.

7. A circuit of the type described in claim 1 including means for controlling the horizontal position at which each line of said raster begins;

means for detecting selected display data type, raster position, and/or other conditions; and means responsive to said detected conditions for altering the position at which said position controlling means initiates a line of the display.

8. A circuit of the type described in claim 7 wherein said position altering means includes means responsive to each of said sync patterns for controlling the position at which a line is initiated.

9. A circuit of the type described in claim 7 wherein a predetermined number of character positions are available for a predetermined group of display lines;

and including means operative when lines of greater than a predetermined length are displayed within a line group for shortening at least one of the lines of the line group to assure that no more than said predetermined number of character positions exist within the group.

10. A circuit of the type described in claim 7 wherein said display device is a cathode ray tube having a display screen and a horizontal deflection coil;

and wherein said position altering means includes means operative at the beginning of lines of the display which are to begin at a point near the left edge of said screen for applying sufficient current to said coil to move the raster to said point, and means operative at the beginning of each line which is to start at a selected point to the right of said predetermined point for reducing the current flow through said coil.

11. A circuit of the type described in claim 10 including means for applying a bias potential across said coil;

and wherein said position altering means includes means operative for shunting current flowing through the deflection coil bias applying means, whereby the current flowing through said coil is reduced.

12. A circuit for controlling the movement of a multiline raster on a cyclically scanned display device comprising:

first control means normally operative to cause each line of said raster to be initiated at a first predetermined position;

second control means selectively operative to, in conjunction with said first control means, cause said line of the raster to be initiated at a second predetermined position;

means for detecting selected raster position and other conditions; and means responsive to the detection of said conditions for a given line of the raster for rendering said second control means operative for said line.

13. A circuit of the type described in claim 12 wherein said display device is a cathode ray tube having a display screen and a horizontal deflection coil;

wherein said first control means includes means operative at the beginning of each line of the display to apply sufficient current to said coil to move the raster to a predetermined point near the left edge of said screen; and wherein said second control means includes means for reducing the current flow through said coil at the beginning of each of said given lines, causing said raster to be deflected only to a selected point to the right of said predetermined point.

14. A circuit of the type described in claim 13 including means for applying a bias potential across said coil;

and wherein said second control means includes means operative for shunting current flowing through the deflection coil bias applying means whereby the current flowing through said coil is reduced.

15. A circuit of the type described in claim 11 wherein a predetermined number of character positions are available for a predetermined group of display lines;

and including means operative when lines of greater than a predetermined length are displayed within a line group for shortening at least one of the lines of the line group to assure that no more than said predetermined number of character positions exist within the group.

16. A circuit for controlling a CRT raster, said raster consisting of a plurality of horizontal lines, each formed by a plurality of vertical strokes, characters being formed for display on said CRT be selectively intensifying index points on said strokes, comprising:

means for advancing said raster from line to line;

means for controlling the position along a line at which the raster for the line begins;

means normally operative at the end of each line for generating a predetermined sync pulse pattern;

means responsive to said predetermined sync pulse pattern for causing said advancing means to advance said raster by a predetermined number of full or partial lines and for causing said position controlling means to begin said raster at a predetermined position on the line;

means operative at the end of a selected line of the display for generating a different sync pulse pattern;

means responsive to said different sync pulse pattern, said means including in part said predetermined sync pulse pattern responsive means, for causing at least one of said advancing means and position controlling means to function differently from the manner in which it functioned in response to said predetermined sync pulse pattern responsive means.

17. A circuit of the type described in claim 16 wherein said predetermined sync pulse pattern generating means includes means for generating a predetermined number of sync pulses;

wherein said different sync pulse pattern generating means includes means for generating a different number of sync pulses; and wherein said advancing means is operative to advance said raster by a predetermined number of full or partial lines in response to each of said sync pulses.

* * * * *